(12) United States Patent
Du et al.

(10) Patent No.: US 12,057,765 B2
(45) Date of Patent: Aug. 6, 2024

(54) DUAL-MODE HIGH-SIDE POWER FIELD-EFFECT TRANSISTOR DRIVER FOR POWER REGULATORS

(71) Applicant: Renesas Electronics America Inc., Milpitas, CA (US)

(72) Inventors: Mengmeng Du, Cary, NC (US); Matthew Alan Grant, Cary, NC (US); Daniel Dahua Zheng, Morrisville, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 262 days.

(21) Appl. No.: 17/707,329

(22) Filed: Mar. 29, 2022

(65) Prior Publication Data

US 2023/0318436 A1 Oct. 5, 2023

(51) Int. Cl.
 *H02M 1/08* (2006.01)
 *H02M 3/155* (2006.01)
(52) U.S. Cl.
 CPC ............. *H02M 1/08* (2013.01); *H02M 3/155* (2013.01)

(58) Field of Classification Search
 CPC ................................ H02M 1/08; H02M 3/155
 See application file for complete search history.

(56) References Cited

U.S. PATENT DOCUMENTS

2018/0198304 A1* 7/2018 Hung ...................... H02J 7/00

* cited by examiner

*Primary Examiner* — Rafael O De Leon Domenech
(74) *Attorney, Agent, or Firm* — SCULLY, SCOTT, MURPHY & PRESSER, P.C.

(57) ABSTRACT

Apparatuses and methods for operating a power converter are described. An integrated circuit can be integrated in a high-side driver of a high-side fiend-effect transistor (FET) of the power converter. The integrated circuit can detect a phase node voltage of a power integrated circuit. The integrated circuit can, in response to the phase node voltage being less than a threshold voltage, operate a high-side FET of the power integrated circuit in a constant-current mode. The integrated circuit can, in response to the phase node voltage being greater than the threshold voltage, operate the high-side FET of the power integrated circuit in a constant-voltage mode.

20 Claims, 4 Drawing Sheets

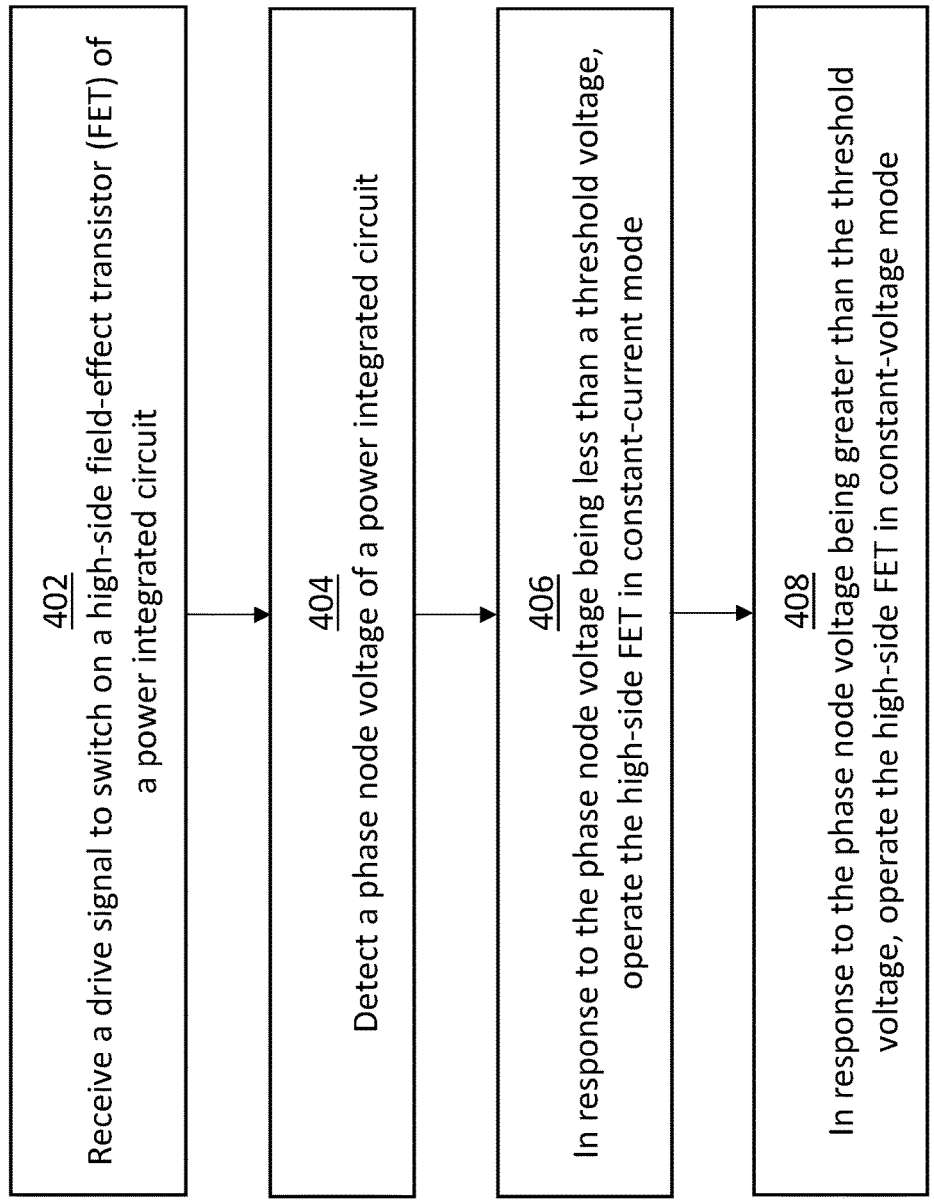

DUAL-MODE HIGH-SIDE POWER FIELD-EFFECT TRANSISTOR DRIVER FOR POWER REGULATORS

BACKGROUND OF THE SPECIFICATION

The present disclosure relates in general to integrated circuit devices and, more particularly, to a dual-mode high-side power field-effect transistor (FET) driving techniques for power regulators.

A power regulator, such as a DC-DC regulator or a step-down buck regulator, can provide an output voltage to a load. The power regulator can include a power integrated circuit (IC) that includes a high-side FET and a low-side FET. The output voltage can be outputted from a phase node situated between the high-side FET and the low-side FET. The high-side FET and the low-side FET can be switched on and switched off alternately to generate the output voltage at the phase node. The switching can cause the output voltage to vary at the phase node, and a slew rate (e.g., changes in voltage or current) at the phase node can impact various components in the power regulator.

SUMMARY

In an embodiment, an apparatus for operating a power converter is generally described. The apparatus can include an integrated circuit. The integrated circuit can be configured to detect a phase node voltage of a power integrated circuit. The integrated circuit can be further configured to, in response to the phase node voltage being less than a threshold voltage, operate a high-side field-effect transistor (FET) of the power integrated circuit in a constant-current mode. The integrated circuit can be further configured to, in response to the phase node voltage being greater than the threshold voltage, operate the high-side FET of the power integrated circuit in a constant-voltage mode.

In another embodiment, an apparatus for regulating power is generally described. The apparatus can include a power integrated circuit, a driver module configured to be in communication with the power integrated circuit, and a controller configured to be in communication with the power integrated circuit and the driver module. The power integrated circuit can include a high-side field-effect transistor (FET) and a low-side FET. The driver module can include a high-side driver circuit configured to drive the high-side FET and a low-side driver configured to drive the low-side FET. The controller can be configured to generate a drive signal for driving the high-side FET. The controller can be further configured to send the drive signal to the high-side driver circuit to operate the high-side driver circuit. The high-side driver circuit can be configured to detect a phase node voltage of the power integrated circuit. The high-side driver circuit can be configured to, in response to the phase node voltage being less than a threshold voltage, operate the high-side FET in a constant-current mode. The high-side driver circuit can be configured to, in response to the phase node voltage being greater than the threshold voltage, operate the high-side FET in a constant-voltage mode.

In another embodiment, a method for operating a power converter is generally described. The method can include receiving a drive signal to switch on a high-side field-effect transistor (FET) of a power integrated circuit. The method can further include detecting a phase node voltage of a power integrated circuit. The method can further include, in response to the phase node voltage being less than a threshold voltage, operating a high-side FET in a constant-current mode. The method can further include, in response to the phase node voltage being greater than the threshold voltage, operating the high-side FET in a constant-voltage mode.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 4 is a flowchart of an example process that may implement dual-mode high-side power FET driver for power regulators according to an embodiment of the disclosure.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
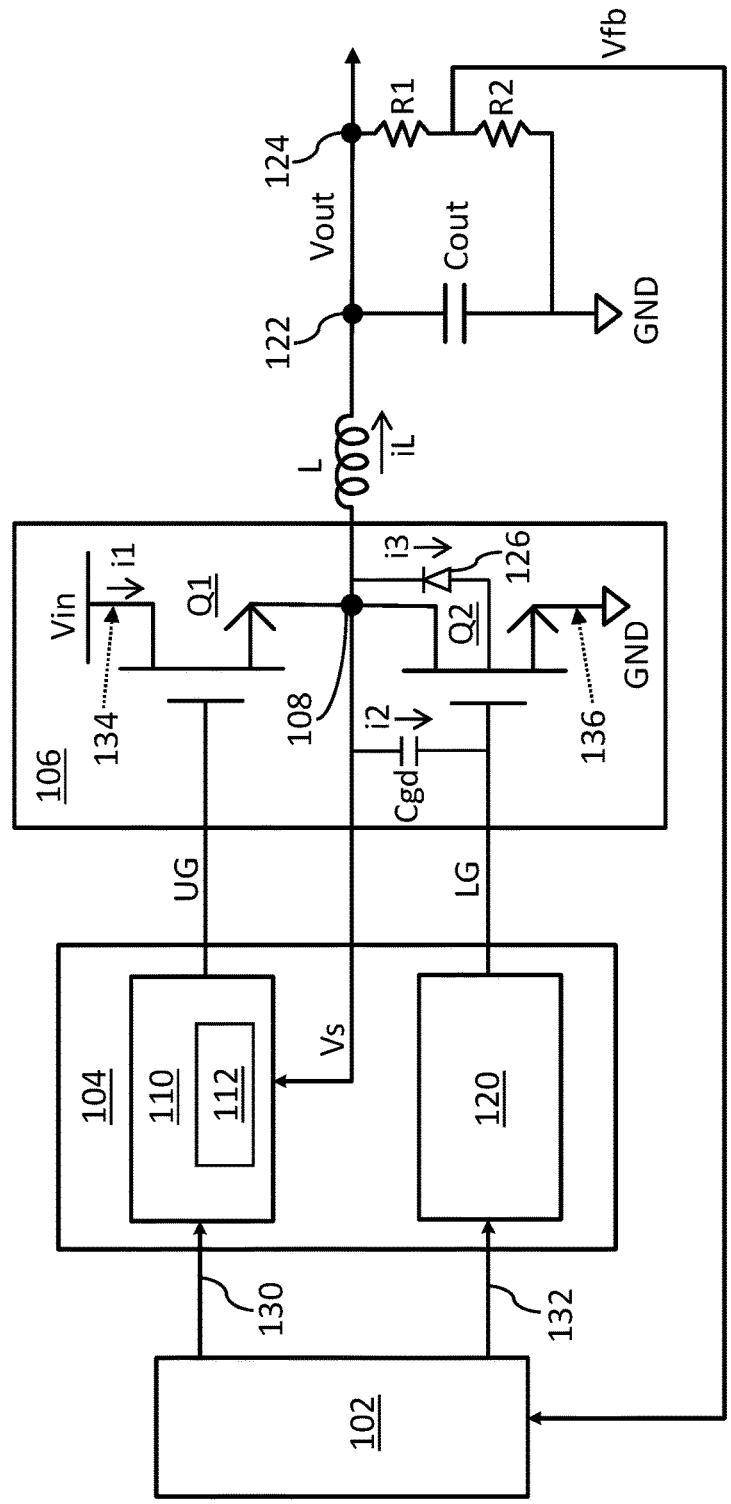
FIG. 1 is a block diagram of an example system for dual-mode high-side power FET driver for power regulators in one embodiment.

FIG. 1 is a block diagram of an example system 100 for dual-mode high-side power FET driver for DC-DC regulators in one embodiment. In one embodiment, system 100 can be implemented as a power regulator (e.g., DC-DC regulator, or step-down buck regulator, etc.) that provides an output voltage Vout to a load that can be connected to system 100. System 100 can include a controller 102, a driver module 104, and a power IC 106. Driver module 104 can include a first driver IC 110 and a second driver IC 120. Power IC 106 can include a high-side FET labeled as Q1 and a low-side FET labeled as Q2. FETs Q1, Q2 can be connected in series between a voltage input terminal that receives a direct-current (DC) voltage Vin supplied from a DC power supply such as a battery and a ground terminal GND.

Controller 102 can be configured to generate and output drive signals 130, 132 to first driver IC 110 and second driver IC 120, respectively. Drive signals 130, 132 can be pulse width modulation (PWM) signals. First driver IC 110 can be a high-side driver configured to drive a gate terminal of high-side FET Q1 using drive signal 130. Second driver IC 120 can be a low-side driver configured to drive a gate terminal of low-side FET Q2 using drive signal 132. Controller 102 can generate and adjust drive signals 130, 132 based on a feedback voltage Vfb measured from an output of system 100. First driver IC 110 can generate a gate drive voltage UG, based on drive signal 130, to drive a gate terminal of high-side FET Q1. Second driver IC 120 can generate a gate drive voltage LG, based on drive signal 132, to drive a gate terminal of low-side FET Q2. Gate terminals of high-side FET Q1 and low-side FET Q2 can be driven to switch on and off alternately, and the alternate switching causes a generation of phase node voltage Vs at a phase node 108 situated between high-side FET Q1 and low-side FET Q2. An inductor (or a coil) L can be connected between phase node 108 and a load connected to an output node 124. A capacitor Cout can be connected between a node 122 and GND to stabilize Vout, where node 122 is between inductor L and output node 124. Resistors R1, R2 can be output voltage sensing resistors connected in series between output node 124 and GND.

First driver IC 110 can include an IC 112 configured to measure Vs from phase node 108. IC 112 can include control logic that can operate or drive high-side FET Q1 in different control modes based on Vs measured from phase node 108. In one embodiment, IC 112 can be configured to compare Vs with a threshold voltage. If Vs is less than the threshold voltage, IC 112 can control UG to operate or drive high-side FET Q1 as a constant-current source (e.g., operate high-side FET Q1 in constant current mode). If Vs is greater than the threshold voltage, IC 112 can control UG to operate or drive high-side FET Q1 as a constant-voltage source (e.g., operate high-side FET Q1 in constant voltage mode). In one embodiment, the output rate of UG can be referred to as a slew rate (e.g., rate of change of voltage or current over time) of UG, and a slew rate of phase node 108 (or rate of change of Vs) can vary with the slew rate of UG. For example, an increase of the output rate of UG or the slew rate of UG can increase the slew rate of phase node 108. The slew rate of UG can be based on the control mode being used for operating high-side FET Q1. For example, under constant-current mode, the slew rate of UG (or slew rate of phase node 108) can be limited to a rate that may be lower than the slew rate of UG (or slew rate of phase node 108) under constant-voltage mode.

In an aspect, high-side FET Q1 is switched from an off state to an on state every cycle in order to generate Vout. Power loss for each cycle of switching high-side FET Q1 can be approximately half of a product of Vin and a current i1 flowing from Vin to high-side FET Q1. Current i1 can be a sum of a current i2, i3, and iL, where i2 can be alternating current for charging a gate to drain capacitance Cgd of low-side FET Q2, i3 can be alternating current for reverse recovery of a body diode 126 of low-side FET Q2, and iL can be the inductor current of inductor L. In an aspect, high slew rate at phase node 108 can minimize non-zero voltage switching power loss and improve power efficiency and thermal performance of system 100. The slew rate at phase node 108 can vary with the output rate of UG or a rate to drive the gate terminal of high-side FET Q1. If first driver IC 110 operates high side FET Q1 as a constant-voltage source, the voltage Vs at phase node 108 can vary at a relatively fast rate (e.g., increased slew rate), causing currents i2 and i3 to increase rapidly (effectively increasing i1). However, the rapid increase of currents i1, i2, i3 can create some undesirable operating conditions for system 100.

For example, the rapid increase in currents i2 and i3 can greatly increase ringing at Vin and GND due to package parasitic at paths connected to Vin and GND, such as at paths 134, 136. The increased ringing can over stress the device implementing system 100, leading to reliability issues and malfunction of sensitive analog circuit components. Further, the increased ringing will increase i1 as well, and the rapid decrease of i3 at the end of reverse recovery results in a high residual i1, resulting in rapid rise of Vs, a large value of i2, and a rise of LG. This rise of LG may accidentally switch on low-side FET Q2 (while high-side FET Q1 is switched on), which can impact power efficiency and may damage high-side FET Q1 and/or low-side FET Q2.

Therefore, a slew rate at phase node 108 being too low can cause increased power loss and worsen power efficiency, but the slew rate being too high can cause other issues as described above. To address the issues caused by the slew rate at phase node 108 being too low or too high, IC 112 can be integrated in first driver IC 110 to perform specific driving technique to drive or operate high-side FET Q1 as either a constant-current source or a constant-voltage source. The driving technique performed by first driver IC 110 using IC 112 can be a dual-mode technique including two phases. A first phase of the two phases is a pre-drive phase that drives high-side FET Q1 as a constant-current source. Under constant-current mode, the total current it in the high-side FET Q1 can be controlled by a pre-driver circuit among IC 112, and increases of current i3 and it can be limited by the constant-current mode operation. As the reverse recovery of body diode 126 completes, current i3 can reduce to zero and Vs at phase node 108 can begin to rise. Detection of the rise of Vs can begin a second phase where high-side FET Q1 is operated in a constant-voltage mode. For example, IC 112 can be configured to monitor Vs being measured at phase node 108 and high-side FET Q1 can be driven in constant-current mode or constant-voltage mode depending on the measured voltage level of Vs. When high-side FET Q1 is being switched from an off state to an on state, Vs can start to increase from zero and high-side FET Q1 can be driven in constant-current mode. Once Vs reaches a certain threshold voltage, high-side FET Q1 can be driven in constant-voltage mode to complete the switch from off state to on state.

In an aspect, Cgd can increase as the voltage across the drain and source terminals (denoted as Vds herein) of low-side FET Q2 decrease. In other words, Cgd can be at its maximum value when low-side Q2 is switched off, and Cgd can be at its minimum value when low-side FET Q2 is switched on. Hence, it may be desirable to reduce a slew rate of phase node 108 when Cgd transitions from its minimum value to its maximum value to reduce current surge going into Cgd. As the high-side FET Q1 switches from off state to on state, Q2 can remain in off state. However, if Vs at phase node 108 rises too fast as Q1 switches from off to on state, i2 can be increased and may become too large and Cgd can reach its max value. Therefore, LG can be pulled up (e.g., by i2 and Cgd) and increases a risk of LG being higher than the threshold voltage of Q2. If LG is higher than the threshold voltage of Q2, both Q1 and Q2 are switched on at the same time, causing shoot-through current from Vin to GND. Therefore, IC 112 can be implemented to first operate Q1 in constant-current mode, then subsequently operate Q1 in constant-voltage mode to reduce current surge into Cgd. By driving Q1 under constant-current mode, then subsequently constant-voltage mode, currents i1, i2, i3 may be increased at a controlled rate that can prevent voltage overshoot, improve power efficiency, reduce power loss, reduce current surge into gate to drain capacitance Cgd of Q2, and provides adequate time for body diode 126 to reverse polarity.

Figure 2:
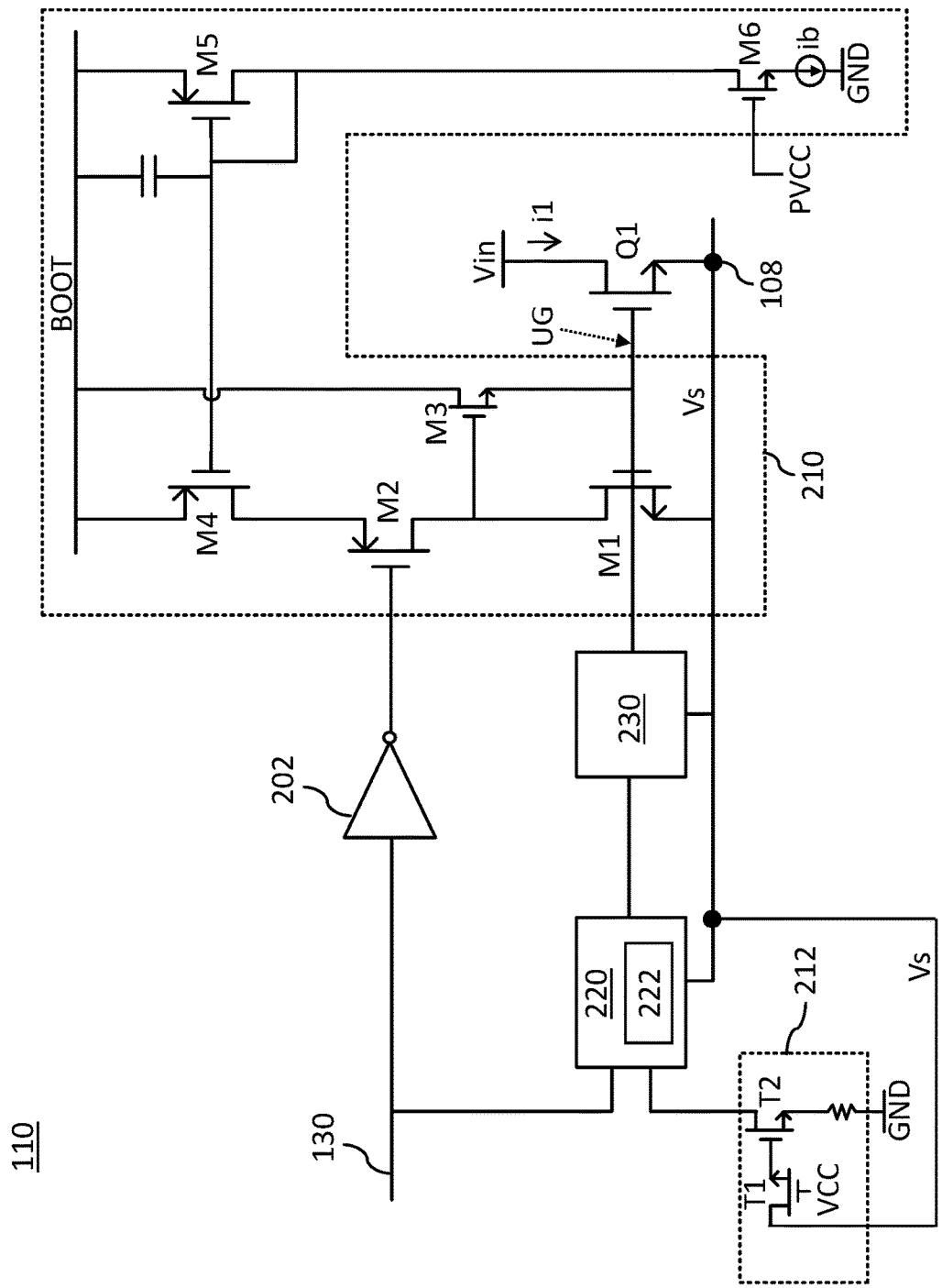
FIG. 2 is a block diagram of an example high-side driver IC that can be implemented for dual-mode high-side power FET driver for power regulators in one embodiment.

FIG. 2 is a block diagram of an example high-side driver integrated circuit that can be implemented for dual-mode high-side power field-effect transistor driver for power regulators in one embodiment. In an example shown in FIG. 2, first driver IC 110 can include an inverter 202, a pre-driver circuit 210, a phase node detector 212, a timer circuit 220, and a driver circuit 230. In one embodiment, pre-driver circuit 210, phase node detector 212, and timer circuit 220 can be ICs integrated on a same chip to form IC 112 shown in FIG. 1. In one embodiment, first driver IC 110 can receive drive signal 130 from controller 102 shown in FIG. 1. Drive signal 130 can be provided to inverter 202 and timer circuit 220. Inverter 202 can output an inverted version of drive signal 130 to drive a transistor M2 in pre-driver circuit 210, where pre-driver circuit 210 is activated in response to transistor M2 being switched on. Pre-driver circuit 210 can be configured to operate high-side FET Q1 in constant-current mode. Driver circuit 230 can be configured to operate high-side FET Q1 in constant-voltage mode. Timer circuit 220 can be configured to control activation and/or deactivation of driver circuit 230. In one embodiment, timer circuit 220 can include a resistive-capacitive (RC) delay circuit that defines a time or delay 222.

Phase node detector 212 can be configured to detect or measure a voltage level of Vs from phase node 108. In one embodiment, a voltage VCC can be provided to a transistor T1 of phase node detector 212. Voltage VCC can be a voltage common collector voltage that is the higher voltage with respect to ground GND. VCC can switch on transistor T1 of phase node detector 212 to allow current generated by Vs to flow through drain and/or source terminals of a transistor T2 of phase node detector 212. In one embodiment, transistor T1 and transistor T2 can be FETs. If Vs is below a threshold voltage of transistor T2, then transistor T2 can be switched off and timer circuit 220 is activated. If Vs is greater than the threshold voltage of transistor T2, then transistor T2 can be switched on and timer circuit 220 can be shorted to GND and deactivated.

In response to an activation of timer circuit 220, driver circuit 230 can be deactivated for a specific amount of time or delay defined by timer circuit 220, such as delay 222. In one embodiment, timer circuit 220 can apply delay 222 on drive signal 130 to prevent drive signal 130 from being inputted to driver circuit 230. Delay 222 can be an amount of time that prevents dead time (e.g., amount of time in which both Q1 and Q2 are switched off) from being too long. During dead time, inductor current iL can flow through body diode 126, which can have a negative impact on power efficiency of system 100. In an example, delay 222 can be 25.0 nanoseconds (ns), and high-side FET Q1 can be operated in constant-current mode by pre-driver circuit 210 for 25.0 ns, or less than, 25.0 ns, before being operated in constant-voltage mode by driver circuit 230. In one embodiment, if Vs rises to a voltage level above the threshold voltage of transistor T2 before a lapse of delay 222, transistor T2 being switched on can force delay 222 to expire such that driver circuit 230 can be activated. In one embodiment, if Vs fails to rise to a voltage level above the threshold voltage of transistor T2 after a lapse of delay 222, delay 222 can automatically expire such that driver circuit 230 can be activated (and timer circuit 220 is forced to be deactivated) regardless of whether Vs exceeded the threshold voltage of T2 or not. If driver 230 does not receive drive signal 130 as an input, driver circuit 230 can be considered as deactivated since there is no input signal to process. Further, the activation of timer circuit 220 and deactivation of driver circuit 230 causes drive signal 130 to be inputted to inverter 202 and pre-driver circuit 210, without inputting drive signal 130 to driver circuit 230.

Timer circuit 220 can be deactivated after a lapse or expiration of delay 222. For example, timer circuit 220 can be deactivated after a lapse of 25.0 ns. In response to a deactivation of timer circuit 220, driver circuit 230 can be activated. In one embodiment, the deactivation of timer circuit 220 can allow drive signal 130 to be inputted to driver circuit 230. In one embodiment, drive signal 130 can be inputted to inverter 202, and pre-driver circuit 210 can be activated in response to first driver IC 110 receiving drive signal 130. Drive signal 130 can start or activate timer circuit 220 in addition to activating pre-driver circuit 210. In response to drive signal 130 rising from low to high, the timer is activated and starts to trickle down from delay 222 (e.g., 25 ns). Then, driver circuit 230 can be activated in response to a first condition or a second condition. The first condition being a detection by phase node detector 212 indicating that Vs is greater than the threshold voltage of T2 before delay 222 expires. The second condition being a detection by phase node detector 212 indicating Vs does not exceed the threshold voltage of T2 before delay 222 expires. Timer circuit 220 can for delay 2 22 to expire in order to activate driver circuit 230. Note that in response to activating driver circuit 230, timer circuit 220 is reset, and both pre-driver circuit 210 and driver circuit 230 activated or in an ON state.

In one embodiment, pre-driver circuit 210 can include FETs M1, M2, M3, M4, M5, M6. FETs M4, M5 can form a current mirror, where a size ratio of M4 to M5 can be m:1. If a size of Q1 is k, then a size ratio of M1 to Q1 can be 1:k. M1 can have the same size as M5 and size ratio of M1 to M4 can be 1:m. M6 can be connected between M5 and GND and can be driven by a voltage PVCC signal that can control a current source that generates a constant current ib flowing from M6 to GND. Pre-driver circuit 210 can use the constant current ib generated by the controlled current source to operate high-side FET Q1 as a constant-current source. The values of m, k and ib can be selected based on max IL, i2 and i3 shown in FIG. 1. Based on the ratios between M1, M4, M5 and Q1, an overall ratio from M5 to Q1 can be a product of k and m. Hence, the current i1 flowing through Q1 can be defined as a product of k, m and ib (e.g., $i1 = k \times m \times ib$). As such, current i1 can be controlled or limited based on sizes of FETs in pre-driver circuit 210.

In response to the activation of pre-driver circuit 210 and the deactivation of driver circuit 230, pre-driver circuit 210 can operate high-side FET Q1 under constant-current mode. In response to the activation of pre-driver circuit 210 and the activation of driver circuit 230, driver circuit 230 can operate high-side FET Q1 under constant-voltage mode. Further, in response to drive signal 130 indicating a logic low or zero, or no drive signal is being received by first driver IC 110, timer circuit 220, pre-driver circuit 210 and driver circuit 230 can be deactivated. In one embodiment, constant-voltage mode being implemented by driver circuit 230 can be a default control mode of first driver IC 110. Thus, if pre-driver circuit 210 is deactivated permanently, high-side FET Q1 can be operated under constant-voltage mode at all times and the slew rate at phase node 108 can become too fast at times. The implementation of pre-driver circuit 210 with driver circuit 230, based on different values of Vs, can provide a technique to operate high-side FET Q1 under a controlled approach that can prevent voltage overshoot, improve power efficiency, reduce power loss, reduce current surge into gate to drain capacitance Cgd of Q2, and provides adequate time for body diode 126 to reverse polarity.

In one embodiment, if a maximum value of Cgd is 1.43 nanofarads (nF), then when Vds is zero or in proximity to zero, Cgd can be at its maximum value of 1.43 nF. When Vds is increased past a certain voltage level, such as 1.5 volts (V), Cgd can be at a minimum value that may be close to zero, such as approximately 0.1 nF. Based on the voltage that causes Cgd to reach its minimum value, such as 1.5 V in this example, a size of transistor T2 may be chosen such that the threshold voltage of transistor T2 is 1.5 V. The threshold voltage of transistor T2 can be set as the threshold voltage being used by phase node detector 2102 to compare with Vs. In one embodiment, under constant-current mode (e.g., by activating pre-driver circuit 210) an output rate of UG can be limited to approximately 2.0 volts per nanosecond (V/ns) if maximum value of Cgd is approximately 1.43 nF. Under constant-voltage mode (e.g., by activating driver circuit 230), the output rate of UG can be approximately 10.0 V/ns. In one embodiment, various simulations can be performed to set the threshold voltage to be compared with Vs. For example, simulations of different voltage levels of UG under constant-current mode and under constant-voltage mode can be performed to identify a value of the threshold voltage that can result in optimal (e.g., lowest) ringing at Vin and GND.

Figure 3:
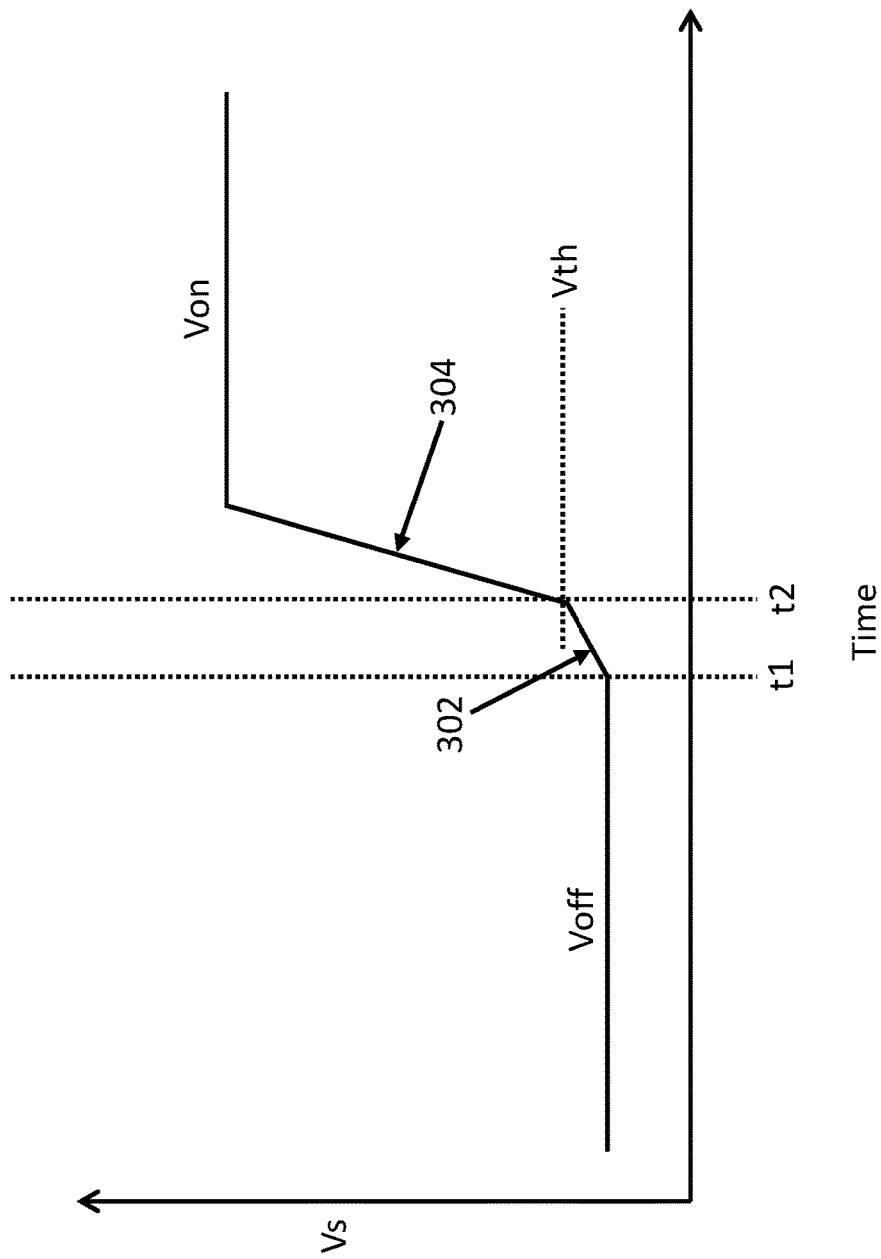
FIG. 3 is a diagram illustrating a phase node voltage that varies with time resulting from an example implementation of dual-mode high-side power FET driver for power regulators in one embodiment.

FIG. 3 is a diagram illustrating a phase node voltage that varies with time resulting from an example implementation of dual-mode high-side power field-effect transistor driver for power regulators in one embodiment. In an example shown in FIG. 3, phase node voltage Vs measured from phase node 108 (see FIG. 1 and FIG. 2) can rise from an off voltage Voff indicating an off state of high-side FET Q1 (see FIG. 1 and FIG. 2) to an on voltage Von indicating an on state of high-side FET Q1. At time t1, first driver IC 110 can receive drive signal 130 (see FIG. 1 and FIG. 2) indicating to switch on high-side FET Q1. Pre-driver circuit 210 in FIG. 2 can operate high-side FET Q1 in constant-current mode to limit the slew rate of phase node 108 to a rate 302 starting from t1. At time t2, Vs can reach threshold voltage Vth (e.g., threshold voltage of T2 in FIG. 2). In response to Vs reaching Vth, driver circuit 230 can be activated to operate high-side FET Q1 in constant-voltage mode where the slew rate of phase node 108 can be at a rate 304 that is greater or faster than rate 302.

FIG. 4 is a flowchart of an example process 400 that may implement dual-mode high-side power FET driver for power regulators according to an embodiment of the disclosure. Example process 400 may include one or more operations, actions, or functions as illustrated by one or more of blocks 402, 404, 406 and/or 408. Although illustrated as discrete blocks, various blocks can be divided into additional blocks, combined into fewer blocks, eliminated, performed in different order, or performed in parallel, depending on the desired implementation.

Process 400 can be performed by, for example, first driver IC 110 shown in FIG. 1 and FIG. 2. Process 400 can be implemented for operating a power converter. Process 400 can begin at block 402. At block 402, an integrated circuit can receive a drive signal to switch on a high-side FET of a power integrated circuit.

Process 400 can proceed from block 402 to block 404. At block 404, the integrated circuit can detect a phase node voltage of a power integrated circuit. Process 400 can proceed from block 404 to block 406. At block 406, the integrated circuit can, in response to the phase node voltage being less than a threshold voltage, operate a high-side FET in a constant-current mode. Process 400 can proceed from block 406 to block 408. At block 408, the integrated circuit can, in response to the phase node voltage being greater than the threshold voltage, operate the high-side FET in a constant-voltage mode.

In one embodiment, the integrated circuit can operate the high-side FET in the constant-current mode by activating a first driver circuit to operate the high-side FET in the constant-current mode and deactivate a second driver circuit configured to operate the high-side FET in the constant-voltage mode. In one embodiment, the deactivation of the second driver circuit can include delaying an input of the drive signal to the second driver circuit.

In one embodiment, in response to the phase node voltage being greater than the threshold voltage, a first driver circuit configured to operate the high-side FET in the constant-current mode can remain activated. The integrated circuit can operate the high-side FET in the constant-voltage mode by activating the second driver circuit to operate the high-side FET in the constant-voltage mode.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   an integrated circuit configured to:
   detect a phase node voltage of a power integrated circuit;
   in response to the phase node voltage being less than a threshold voltage before a lapse of a delay, allow the delay to lapse and operate a high-side field-effect transistor (FET) of the power integrated circuit in a constant-current mode, wherein the delay is predefined to limit a dead time of the power integrated circuit; and
   in response to the phase node voltage being greater than the threshold voltage before the lapse of the delay, force the delay to lapse and operate the high-side FET of the power integrated circuit in a constant-voltage mode.

2. The apparatus of claim 1, wherein the integrated circuit comprises:
   a first driver circuit configured to operate the high-side FET of the power integrated circuit in the constant-current mode; and a second driver circuit configured to operate the high-side FET of the power integrated circuit in the constant-voltage mode.

3. The apparatus of claim 2, wherein the integrated circuit is configured to:
   in response to the phase node voltage being less than the threshold voltage, activate the first driver circuit to operate the high-side FET in the constant-current mode; and
   deactivate the second driver circuit.

4. The apparatus of claim 3, wherein the integrated circuit comprises a timer circuit configured to delay an input of a drive signal to the second driver circuit to deactivate the second driver circuit.

5. The apparatus of claim 2, wherein the integrated circuit is configured to:
   in response to the phase node voltage being greater than the threshold voltage, activate the second driver circuit to operate the high-side FET in the constant-voltage mode.

6. The apparatus of claim 5, wherein the first driver circuit remains activated in response to activation of the second driver circuit.

7. The apparatus of claim 2, wherein the integrated circuit is configured to, in response to receiving a drive signal for switching off the high-side FET, deactivate the first driver circuit and the second driver circuit.

8. The apparatus of claim 1, wherein the integrated circuit comprises a phase node detector configured to:
   detect the phase node voltage of the power integrated circuit; and
   compare the phase node voltage with the threshold voltage.

9. An apparatus comprising:
   a power integrated circuit comprising a high-side field-effect transistor (FET) and a low-side FET;
   a driver module comprising a high-side driver circuit configured to operate the high-side FET and a low-side driver configured to operate the low-side FET; and
   a controller configured to be in communication with the power integrated circuit and the driver module, the controller being configured to:
      generate a drive signal for operating the high-side FET; and
      send the drive signal to the high-side driver circuit to operate the high-side driver circuit;
   wherein the high-side driver circuit being configured to:
      detect a phase node voltage of the power integrated circuit;
      in response to the phase node voltage being less than a threshold voltage before a lapse of a delay, allow the delay to lapse and operate the high-side FET in a constant-current mode, wherein the delay is predefined to limit a dead time of the power integrated circuit; and
      in response to the phase node voltage being greater than the threshold voltage before the lapse of the delay, force the delay to lapse and operate the high-side FET in a constant-voltage mode.

10. The apparatus of claim 9, wherein the high-side driver circuit comprises:
    a first driver circuit configured to operate the high-side FET of the power converter in the constant-current mode; and
    a second driver circuit configured to operate the high-side FET of the power converter in the constant-voltage mode.

11. The apparatus of claim 10, wherein the high-side driver circuit is configured to:
    in response to the phase node voltage being less than the threshold voltage, activate the first driver circuit to operate the high-side FET in the constant-current mode; and
    deactivate the second driver circuit.

12. The apparatus of claim 11, wherein the controller is configured to:
    generate a drive signal for driving the high-side FET;
    send the drive signal to the high-side driver circuit; and
    the high-side driver circuit comprises a timer circuit configured to delay an input of the drive signal to the second driver circuit to deactivate the second driver circuit.

13. The apparatus of claim 10, wherein the high-side driver circuit is configured to:
    in response to the phase node voltage being greater than the threshold voltage, activate the second driver circuit to operate the high-side FET in the constant-voltage mode.

14. The apparatus of claim 13, wherein the first driver circuit is configured to remain activated in response to activation of the second driver circuit.

15. The apparatus of claim 10, wherein the high-side driver circuit is configured to, in response to the drive signal indicating a switch off of the high-side FET, deactivate the first driver circuit and the second driver circuit.

16. The apparatus of claim 10, wherein the high-side driver circuit comprises a phase node detector configured to:
    detect the phase node voltage of the power integrated circuit; and
    compare the phase node voltage with the threshold voltage.

17. A method for operating a power converter, the method comprising:
    receiving a drive signal to switch on a high-side field-effect transistor (FET) of a power integrated circuit;
    detecting a phase node voltage of a power integrated circuit;
    in response to the phase node voltage being less than a threshold voltage before a lapse of a delay, allow the delay to lapse and operating a high-side FET in a constant-current mode, wherein the delay is predefined to limit a dead time of the power integrated circuit; and
    in response to the phase node voltage being greater than the threshold voltage before the lapse of the delay, forcing the delay to lapse and operating the high-side FET in a constant-voltage mode.

18. The method of claim 17, wherein operating the high-side FET in the constant-current mode comprises:
    activating a first driver circuit to operate the high-side FET in the constant-current mode; and
    deactivate a second driver circuit configured to operate the high-side FET in the constant-voltage mode.

19. The method of claim 18, wherein deactivating the second driver circuit comprises delaying an input of the drive signal to the second driver circuit.

20. The method of claim 17, wherein in response to the phase node voltage being greater than the threshold voltage, a first driver circuit configured to operate the high-side FET in the constant-current mode remains activated, and operating the high-side FET in the constant-voltage mode comprises activating a second driver circuit to operate the high-side FET in constant-voltage mode.

* * * * *